Feb. 6, 1962 W. L. SHOCKLEY 3,020,492
FREQUENCY-CONTROLLED MAGNETIC OSCILLATOR
Filed Sept. 12, 1960
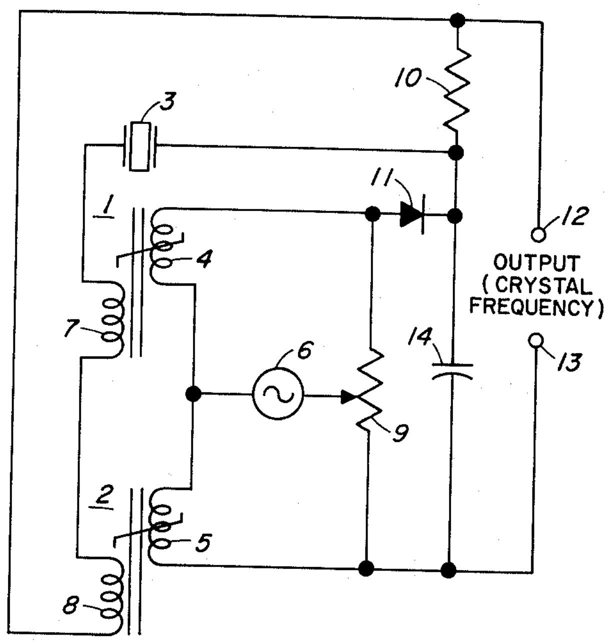
INVENTOR.
WILLIAM L. SHOCKLEY
BY Moody and Antrim
AGENTS United States Patent Office 3,020,492

Patented Feb. 6, 1962

3,020,492

FREQUENCY-CONTROLLED MAGNETIC OSCILLATOR

William L. Shockley, Richardson, Tex., assignor to Collins Radio Company, Cedar Rapids, Iowa, a corporation of Iowa Filed Sept. 12, 1960, Ser. No. 55,232
3 Claims. (Cl. 331—158)

This invention pertains to oscillators and particularly to magnetic oscillators which have means for accurately controlling predetermined frequencies of oscillation.

According to the present invention, a high-Q frequency-determining element, for example, a piezoelectric crystal, has been applied to a magnetic amplifier circuit to generate signal at the resonant frequency of the crystal.

The oscillator of this invention comprises saturable magnetic circuits having a primary circuit in a balanced arrangement with respect to a source of alternating current, a magnetically coupled secondary circuit having a frequency-determining element and an impedance element coupled regeneratively to said primary circuit, said frequency-determining element being resonant at a frequency substantially lower than the frequency of said source so that the signal applied from said source is modulated at said resonant frequency, and a demodulating circuit coupled to said magnetic circuit.

An object of this invention is to provide an oscillator that generates signal at a precisely controlled frequency and that has the dependability and ruggedness of a magnetic amplifier.

A feature of the oscillator of this invention is its employment of component parts which retain stable operating characteristics after being exposed to relatively high ambient temperature, radiation, or momentary electric overload.

The following description and the appended claims may be more readily understood with reference to the accompanying drawing, in which the single figure shows schematically the frequency-controlled magnetic oscillator of this invention.

The similar saturable inductors 1—2 are connected to perform essentially the function of a magnetic amplifier. The crystal 3 is connected in the secondary or control circuit in place of the usual source of direct-current control voltage and is connected regeneratively to a load resistor which is in series with the primary circuit.

The primary windings 4—5 of the saturable inductors are connected in a balanced arrangement to a source of alternating-current voltage 6, and the secondary windings 7—8 are connected in series in the required sense to cancel substantially all of the induced voltage which has the frequency of the power source 6. The resistance element of potentiometer 9 is connected in series between the outside terminals of the series windings 4—5. The alternating-current power source 6 is connected between the junction of series windings 4—5 and the variable tap of potentiometer 9.

The demodulator circuit for separating the signal component at the crystal frequency from the signal component at the frequency of the voltage derived from the source 6 includes diode rectifier 11 and filter capacitor 14. Rectifier 11 is connected in series with the potentiometer 9, a load resistor 10, and an output circuit which may be connected to terminals 12—13. The filter capacitor 14 is connected in parallel with the series load resistor 10 and the output circuit. The frequency-control circuit includes the secondary windings 7—8 of the saturable inductors and the quartz oscillator crystal 3 connected in series across load resistor 10 of the primary circuit.

The saturable reactors 1—2 are the usual type which have steep hysteresis curves and which are adaptable to magnetic amplifiers. The resonant frequency of crystal 3 is low compared with the frequency of the voltage derived from source 6. For example, the frequency of the crystal oscillator might be 10 kilocycles, and the frequency of the source might be 100 kilocycles. The variable contact of potentiometer 9 is adjusted for obtaining minimum amplitude of voltage in the output circuit at the frequency of the power source.

When power is applied to start oscillation, a surge of voltage derived from the power source is applied across resistor 10 for exciting crystal 3. Upon oscillating at its resonant frequency, crystal 3 varies the current through series windings 7—8 to vary the permeability of saturable inductors 1—2 at the frequency of the crystal. Therefore, the crystal modulates the flow of current in the primary circuit as derived from source 6 so that amplified voltage at the crystal frequency appears across resistor 10. This voltage is applied in a regenerative sense to the control circuit which includes windings 7—8 and crystal 3 to sustain oscillation at the crystal frequency.

The voltage which appears across potentiometer 9 corresponds to a modulated carrier signal which has a carrier frequency equal to that of the source 6 and a modulation frequency equal to the resonant frequency of the crystal 3. The modulated signal which appears across potentiometer 9 is rectified by diode detector 11 and filtered by capacitor 14 to apply signal voltage at the crystal frequency to output terminals 12 and 13.

Other known magnetic amplifier circuits may be substituted for the one shown. The magnetic amplifier must provide sufficient gain to sustain oscillation at the crystal frequency. The addition of diode rectifiers in the usual manner to the magnetic amplifier that is shown may improve its operation. Although this invention has been described with reference to a particular circuit, the circuit may be modified by those skilled in the art to include other known magnetic amplifiers and frequency-determining elements and still be within the spirit and the scope of the following claims.

What is claimed is:

1. A magnetic oscillator in combination with a high-Q resonant frequency-determining device for developing signal at the frequency of said device comprising, saturable inductor means having primary and secondary circuits, a source connected to said primary circuit to apply alternating current which has a frequency substantially higher than the resonant frequency of said frequency-determining device, said primary circuit of said saturable inductor means being connected in a balanced arrangement for substantially cancelling in the secondary circuit the induced voltage at said higher frequency, means for coupling said frequency-determining device between said primary and secondary circuits in a regenerative sense to sustain oscillation in said inductor means at the frequency of said frequency-determining device, said sustained oscillations modulating that current applied to said primary circuit from said source, and demodulating means coupled to said primary circuit in a balanced arrangement with respect to said source for demodulating said modulated current to provide signal at the frequency of said frequency-determining device.

2. A magnetic oscillator comprising, a quartz crystal for determining the frequency of the output signal of said oscillator, saturable inductor means having primary and secondary circuits, load impedance means, a source of alternating current which has a frequency substantially higher than the resonant frequency of said crystal, said source and said load impedance means being connected in said primary circuit, said crystal and said load being connected in said secondary circuit in a sense that provides regeneratively coupling from said primary circuit to said secondary circuit at the resonant frequency of said crystal, said secondary circuit being balanced with respect to said source for substantially cancelling the voltage induced therein from said primary circuit, and a demodulator connected to said primary circuit to supply output signal at the resonant frequency of said crystal.

3. A frequency-controlled magnetic oscillator comprising, first and second saturable inductors, each of said inductors having at least a primary winding and a secondary winding, said primary windings being joined in a series connection, a load resistor and a potentiometer serially connected with said series windings, a source of alternating current connected between the junction of said primary windings and a variable tap of said potentiometer, a quartz oscillator crystal having a resonant frequency substantially lower than the frequency of the current supplied by said source, said secondary windings being serially connected in an opposing sense relative to said source, said secondary windings and said crystal being connected in a series circuit across said load resistor to form a regenerative circuit for maintaining oscillation at the resonant frequency of said crystal, and a demodulation circuit coupled to said primary windings to provide an output voltage at said resonant frequency of said crystal.

No references cited.